C. P. BUCK.
SHEET METAL CUTTING MACHINE.
APPLICATION FILED FEB. 19, 1918.

1,327,082.

Patented Jan. 6, 1920.

Inventor
C. P. Buck.
By George H. Thorpe
Attorney

UNITED STATES PATENT OFFICE.

CHARLES P. BUCK, OF TOPEKA, KANSAS.

SHEET-METAL-CUTTING MACHINE.

1,327,082.  Specification of Letters Patent.  Patented Jan. 6, 1920.

Application filed February 19, 1918. Serial No. 218,905.

*To all whom it may concern:*

Be it known that I, CHARLES P. BUCK, a citizen of the United States, residing at Topeka, in the county of Shawnee and State of Kansas, have invented certain new and useful Improvements in Sheet-Metal-Cutting Machines, of which the following is a specification.

This invention relates to sheet metal cutting machines, and more especially to machines for producing segment-shaped openings in large plates, *i. e.*, in plates too unwieldy for satisfactory handling with an ordinary punch press, and my object is to produce a machine by which segmental openings may be expeditiously and economically produced in sheets of any size. A further object is to produce a machine of comparatively inexpensive construction not liable to get out of repair under ordinary service, and which is not dangerous to the operator.

With these objects in view the invention consists in certain novel and useful features of construction and combinations of parts as hereinafter described and claimed: and in order that the invention may be fully understood, reference is to be had to the accompanying drawing, in which:—

Figure 1:
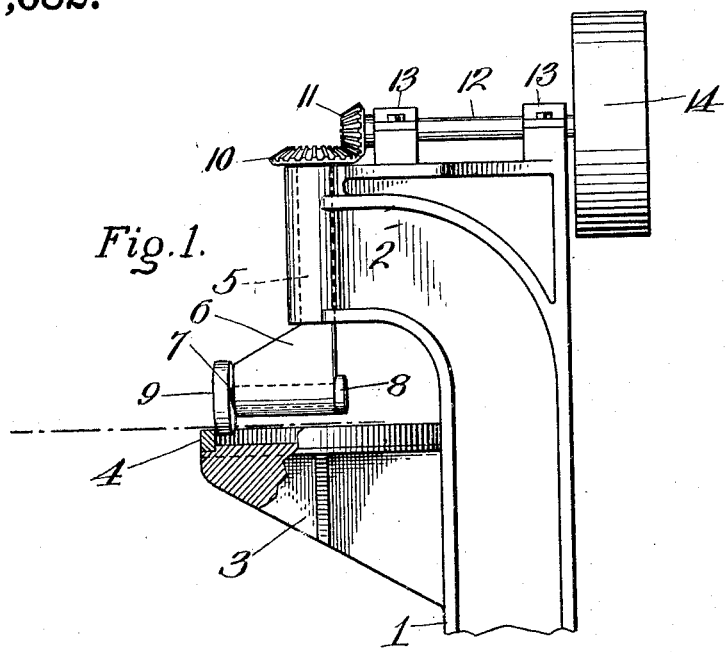
Figure 1, is a fragmentary side view of a sheet-metal cutting machine embodying my invention.

In the said drawing, 1 indicates a frame or standard having its upper end 2 overhanging a shelf 3 upon which is rigidly secured as shown or in any other suitable manner, a circular or ring die 4, the inner edge of said die being sharpened for cutting purposes.

A vertical shaft is journaled in the overhanging end 2 of the frame, and is disposed in axial alinement with the said die 4, and is provided at its lower extremity with a head or enlargement 6, through which extends horizontally and radially of the said die, a shaft 7, having a head 8, at one end and a roller die 9 at its opposite end, the diameter of the roller die being such that it slightly overlaps the inner edge of the ring die to have a shearing relation thereto without actual contact therewith.

Mounted upon the upper end of the shaft 5, is a beveled gear 10 meshing with a beveled gear 11, on one end of a shaft 12, journaled in bearings 13 at the top of the frame. The shaft is equipped with a drive wheel 14 for operation by a belt, not shown, or by any other suitable power. The means for controlling the machine may be such as used on the ordinary punch press.

Figure 2:
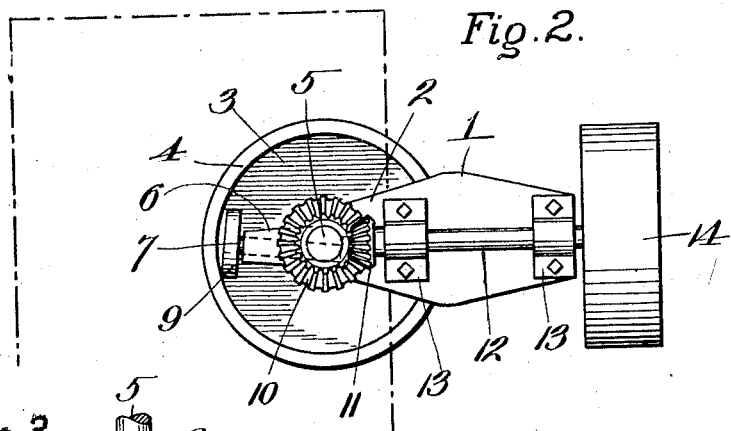
Fig. 2, is a top plan view of the same.
Figure 3:
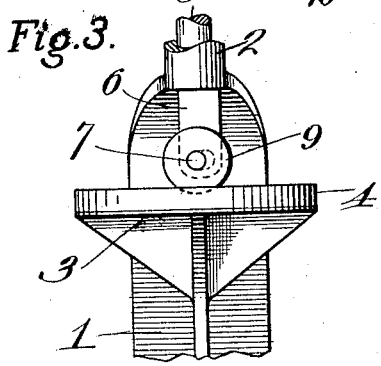
Fig. 3, is a fragmentary front view of the machine.

A plate in which openings are to be made, is fitted on the ring die as indicated by the dotted lines in Figs. 1 and 2, it being noted that the roller die at such time must be outward of the edge of the plate because it depends below the plane of the latter and hence must begin its cutting function from a point beyond the edge of the plate, the roller die making a shearing cut and producing an opening in the metal plate corresponding in form and size to the inner edge of the ring die. In the interim between the completion of a cutting operation by the roller die and its reëngagement with the plate, the latter can be shifted longitudinally so that the next action of the roller die shall produce another opening in the plate. It will thus be seen that openings can be produced expeditiously and cheaply in plates of such length as to be difficult of handling in an ordinary punch press.

From the above description it will be seen that I have produced a sheet metal cutting machine embodying the features of advantage set forth as desirable in the statement of the object of the invention, and while I have illustrated the preferred form of the same, it will be apparent that it is susceptible of modification in minor particulars without departing from the scope of the appended claims.

I claim:

1. A sheet metal cutting machine, comprising a frame, an immovable ring die secured to the frame, a shaft disposed in alinement with the axis of said ring die, a shaft carried by the first-named shaft and extending parallel with the face and convergingly outward with respect to a radius of said ring die, and a rotatable cutting die mounted on said last-named shaft and bearing a shearing relation to the ring die for coöperating therewith in cutting a segmental opening in a plate resting on said ring die.

2. A sheet metal cutting machine, comprising a frame, an immovable ring die secured thereto, a vertical shaft journaled in the frame in alinement with the axis of said die, and provided at its lower end with a head, a horizontal shaft journaled in said head and extending parallel with the face and convergingly outward with respect to a radius of said ring die, a roller die upon said horizontal shaft and overlapping the inner edge of the ring die and bearing a shearing relation thereto, and driving means for said first-named shaft.

In testimony whereof I affix my signature.

CHARLES P. BUCK.